(12) United States Patent
Wu

(10) Patent No.: US 8,409,745 B2
(45) Date of Patent: Apr. 2, 2013

(54) TERMINAL POLE HEAD FOR A BATTERY PACK

(75) Inventor: Donald P. H. Wu, Hsinchu County (TW)

(73) Assignee: Energy Control Limited, Tortola (VG)

( * ) Notice: Subject to any disclaimer, the term of this patent is extended or adjusted under 35 U.S.C. 154(b) by 391 days.

(21) Appl. No.: 12/943,907

(22) Filed: Nov. 10, 2010

(65) Prior Publication Data

US 2012/0115006 A1     May 10, 2012

(51) Int. Cl.
    *H01M 2/26*     (2006.01)
    *H01M 10/38*     (2006.01)
    *H01M 2/02*     (2006.01)
    *H01M 6/42*     (2006.01)
    *H01R 11/00*     (2006.01)
    *H01R 24/00*     (2011.01)

(52) U.S. Cl. ........ 429/121; 429/123; 429/178; 429/149; 439/504; 439/627; 439/755

(58) Field of Classification Search .................. 429/121, 429/123, 161, 178, 149, 152, 164, 165, 170; 439/202, 366, 504, 627, 754–774
See application file for complete search history.

(56) References Cited

U.S. PATENT DOCUMENTS

| | | | | |
|---|---|---|---|---|
| 5,977,746 A * | 11/1999 | Hershberger et al. | .......... | 320/112 |
| 6,410,185 B1 * | 6/2002 | Takahashi et al. | ............ | 429/163 |
| 6,428,925 B1 * | 8/2002 | Takeno et al. | ................. | 429/163 |
| 7,609,028 B2 * | 10/2009 | Ha et al. | ........................ | 320/116 |
| 7,659,029 B2 * | 2/2010 | Ota et al. | ....................... | 429/152 |
| 7,887,943 B2 * | 2/2011 | Yoshikane et al. | ............ | 429/123 |

* cited by examiner

*Primary Examiner* — Carlos Barcena

(57) ABSTRACT

A terminal pole head for a battery pack comprises a base element, an isolating element and the top element that assembled one upon another, so that the assembly is easy, and the appearance is smooth after assembly. Further, the base element and the top element are isolated more safely. The isolating element covers the main body of the base element with the first and the second connecting portions exposed only, so that it can avoid the occurrence of short circuit of the base element and the top element caused by mistake touch of metal object. In addition, the base element and the top element are formed with the first connecting portions, the second connecting portions, and the connecting plates, so that connecting points are scattered, which is quite important for the big power battery pack, solving the problem of temperature rise due to excessively high single point resistance.

1 Claim, 7 Drawing Sheets

TERMINAL POLE HEAD FOR A BATTERY PACK

BACKGROUND OF THE INVENTION

1. Field of the Invention

The present invention relates to a battery pack, and more particularly to a terminal pole head for a battery pack.

2. Description of the Prior Art

Referring to FIG. 1, a conventional battery pack 10 comprises a plurality of battery cells 11 which are electrically connected together by metal conductive strips 12 and then welded to a positive conductive strip 13 and a negative conductive strip 14 that serve as power output terminals.

It is to be noted that, the above conventional battery pack structure may be applicable to the small power battery packs, but not to the big power battery packs, since the big power battery packs comprise a large number of battery cells that lead to complicated parallel contacts and serial contacts.

The present invention has arisen to mitigate and/or obviate the afore-described disadvantages.

SUMMARY OF THE INVENTION

The primary objective of the present invention is to provide a terminal pole head for a battery pack which comprises a base element, an isolating element and a top element that are assembled one upon another, not only is the assembly easy, but the appearance is smooth after assembly. In addition, the base element and the top element are isolated more safely. The isolating element covers the main body of the base element with the first and the second connecting portions exposed only, so that it can avoid the occurrence of short circuit of the base element and the top element.

The secondary objective of the present invention is to provide a terminal pole head for a battery pack, the base element and the top element are formed with the first connecting portions, the second connecting portions, and the connecting plates, so that connecting points are scattered, which is quite important for the big power battery pack since it solves the problem of temperature rise caused by excessively high single point resistance.

DETAILED DESCRIPTION OF THE PREFERRED EMBODIMENTS

Figure 1:
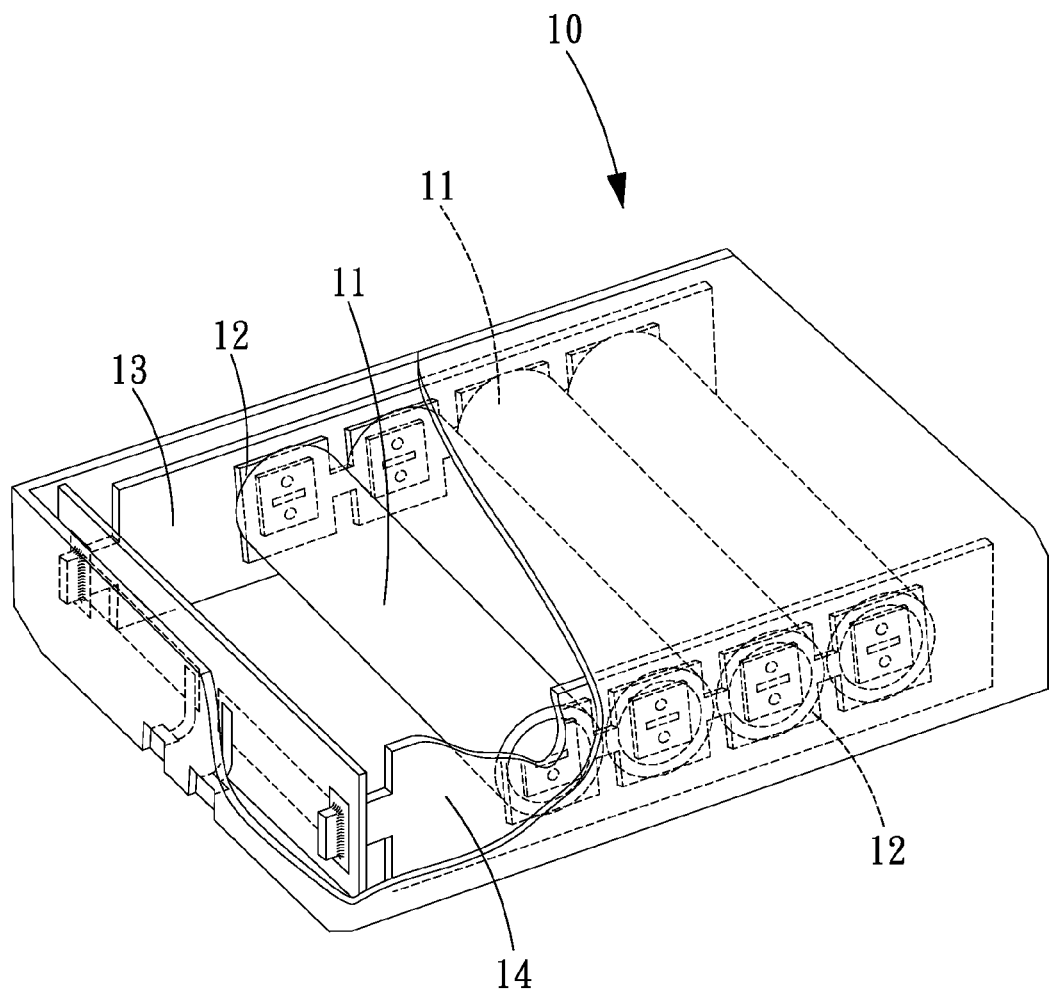
FIG. 1 is a perspective view of a conventional battery pack.

The present invention will be clearer from the following description when viewed together with the accompanying drawings, which show, for purpose of illustrations only, the preferred embodiment in accordance with the present invention.

FIGS. 2-6 show a terminal pole head for a battery pack in accordance with the present invention. The battery pack 50 includes plural battery cells 51 that are electrically connected to positive output terminals 53 and negative output terminals 54 through conductive strips 52. The terminal pole head in accordance with the present invention comprises a base element 20, an isolating element 30 and a top element 40.

The base element 20 is a conductive element and includes a main plate 21. The main plate 21 includes a bottom surface 211 and a top surface 212. The main plate further includes an assembling end 22 and an output end 23 that are opposite each other. The assembling end 22 is formed with two first connecting plates 24 on two opposite sides of the top surface 212. The two first connecting plates 24 are spaced by a certain distance, so that the two first connecting plates 24 and the top surface 212 can define a space therebetween. An outer surface of each of the two first connecting plates 24 is defined as a first connecting portion 241. The output end 23 is formed with two second connecting plates 25 on two opposite sides of the top surface 212. A conductive pin 26 protrudes from the top surface 212 between the two second connecting plates 25. An outer surface of each of the two second connecting plates 25 is defined as a second connecting portion 251. The first connecting portions 241 and the second connecting portions 251 are electrically connected to the positive output terminals 53 through screws 55.

The isolating element 30 includes a base plate 31. The base plate 31 includes a first surface 311 and a second surface 312 that are opposite each other. The base plate 31 is further formed with an isolating cap 32 and a guide cap 33. The guide cap 33 is formed with a guide hole 331 at an inner side thereof while the isolating cap 32 is formed with a groove 321 at an inner side thereof. The isolating element 30 covers the base element 20. The first surface 311 covers the top surface 212 of the base element 20. The isolating cap 32 covers the assembling end 22 only with the first connecting portions 241 exposed. The guide cap 33 covers the output end 23 in such a manner that the conductive pin 26 penetrates the guide hole 331, and only the second connecting portions 251 of the two connecting plates 25 are exposed.

The top element 40 is a conductive element and formed with a conductive pin 41 protruding from a first end thereof. A second end of the top element 40 is formed with a conductive portion 42. The conductive portion 42 is formed with two connecting plates 421 at two opposite sides thereof. The top element 40 is disposed on the second surface 312 of the isolating element 30 and isolated from the base element 20. The conductive pin 41 of the top element 40 is located within the groove 321 of the isolating cap 32 while the two connecting plates 421 of the top element are located outside the main plate 21 of the base element 20. The two connecting plates 421 are electrically connected to the negative output terminals 54 of the battery pack 50.

The aforementioned is the summary of the positional and structural relationship of the respective components of the preferred embodiment in accordance with the present invention.

Figure 2:
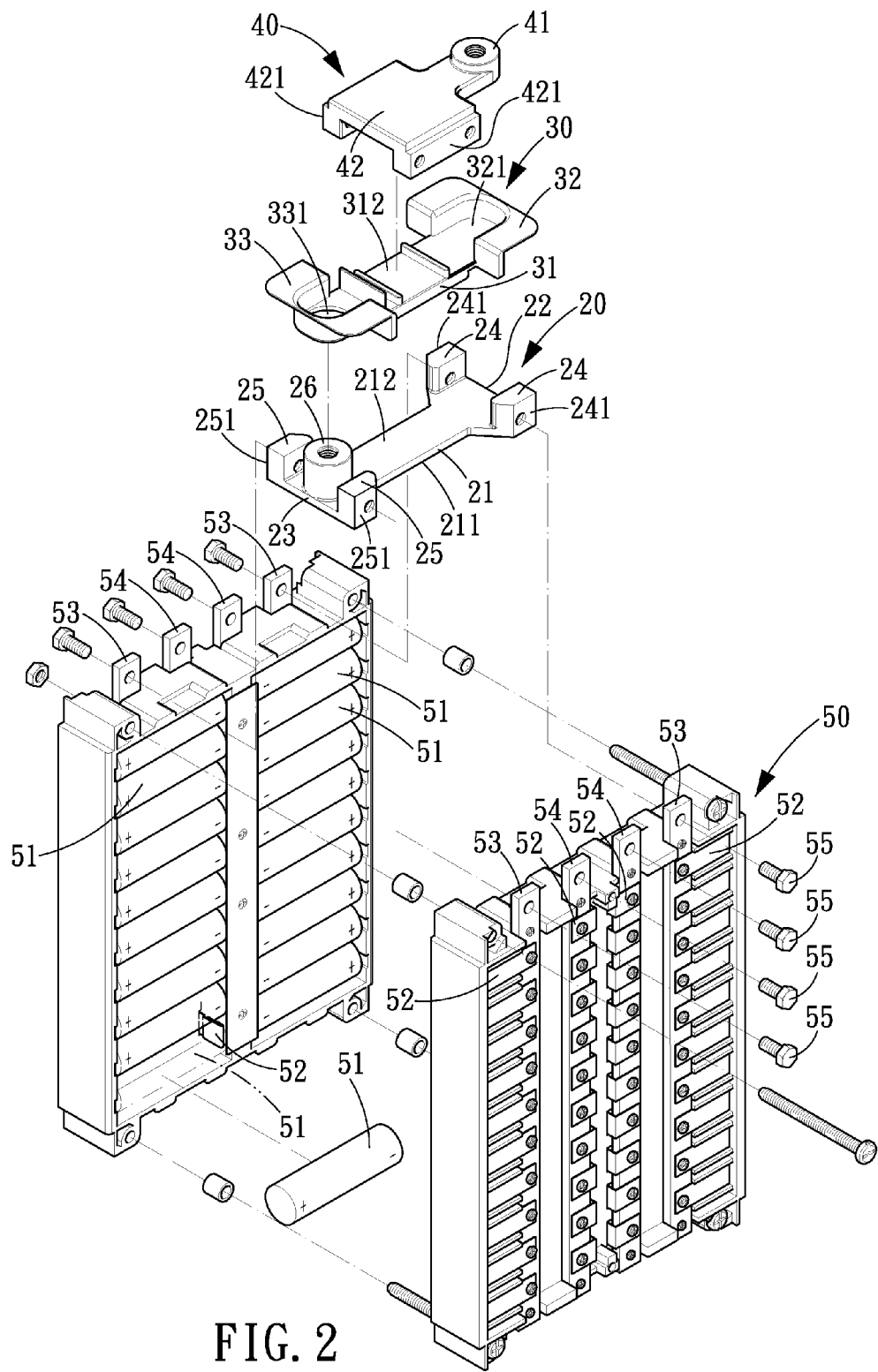
FIG. 2 is an exploded view of a terminal pole head for a battery pack in accordance with the present invention.
Figure 3:
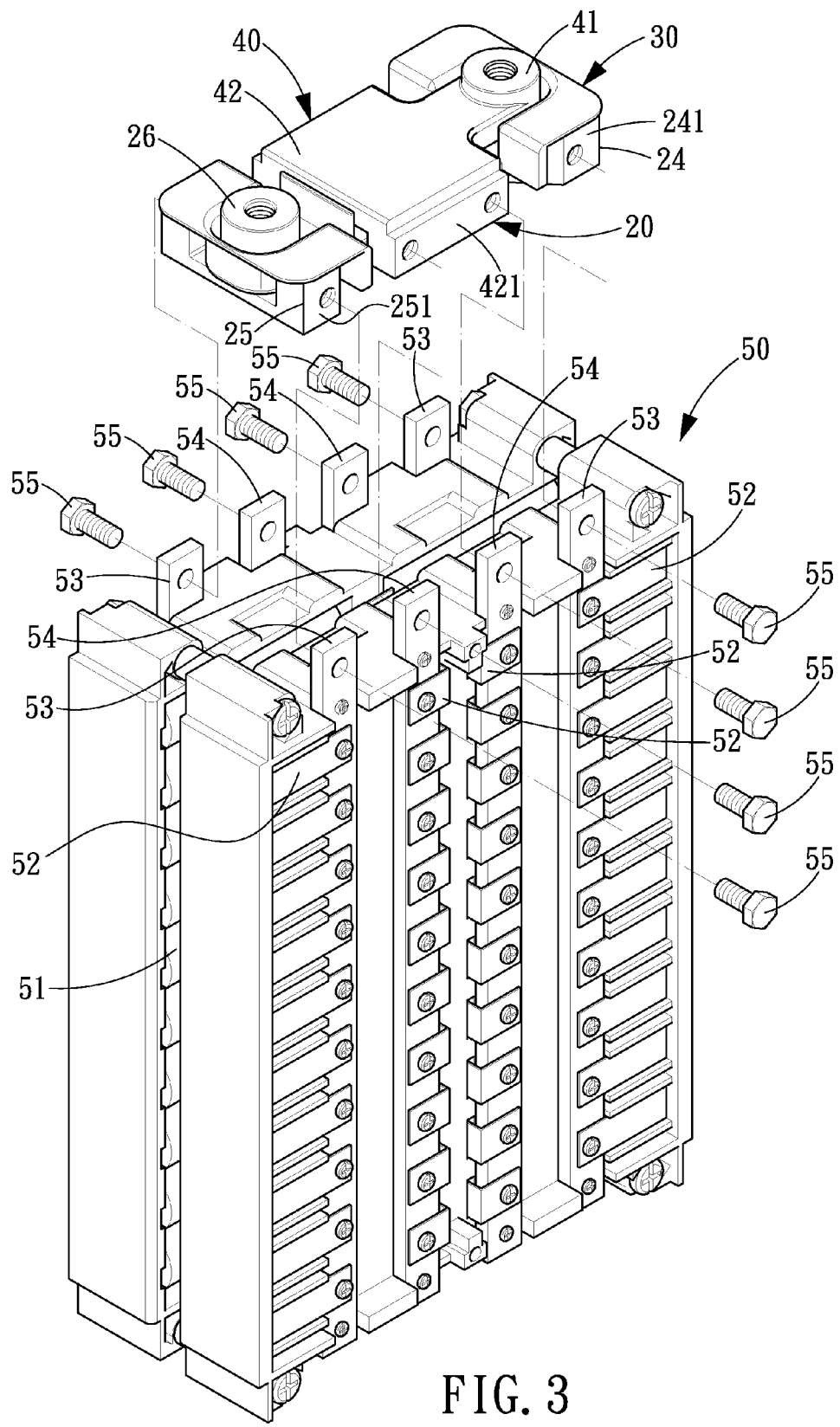
FIG. 3 is a combinational view of the terminal pole head for a battery pack in accordance with the present invention.
Figure 4:
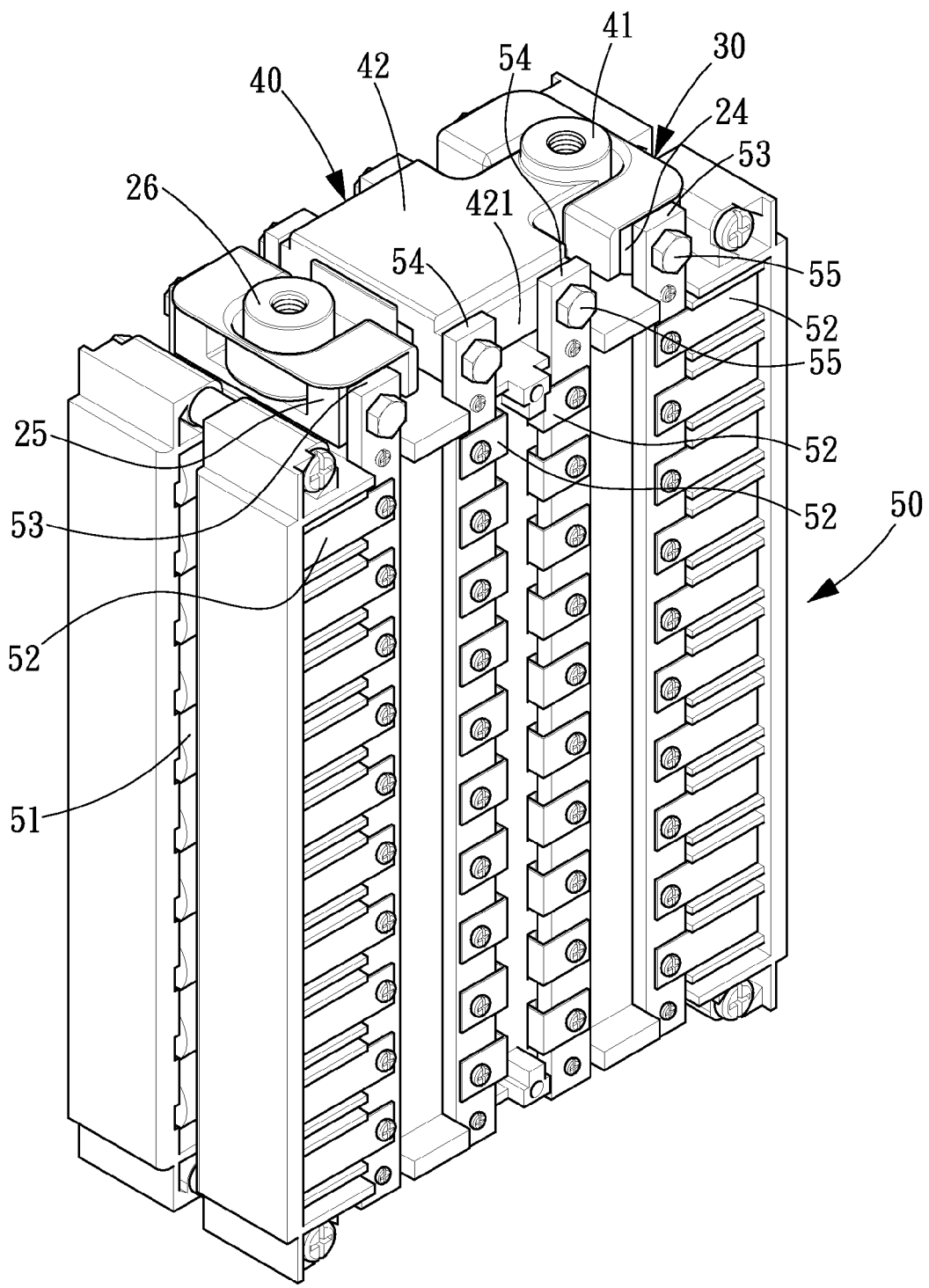
FIG. 4 is a combinational view showing that the terminal pole head for a battery pack in accordance with the present invention is assembled on the battery pack.

For a better understanding of the present invention, its operation and function, reference should be made to FIGS. 2-4:

After the respective battery cells 51 in the battery pack 50 are electrically connected to the positive output terminals 53 and the negative output terminals 54 through conductive strips 52, the positive output terminals 53 will be electrically connected to the first and the second connecting portions 241, 251 of the base element 20, and the negative output terminals 54 will be electrically connected to the connecting plates 421 of the top element 40. By such arrangements, the power of the battery pack 50 is outputted through the base element 20 and the top element 40.

Figure 5:
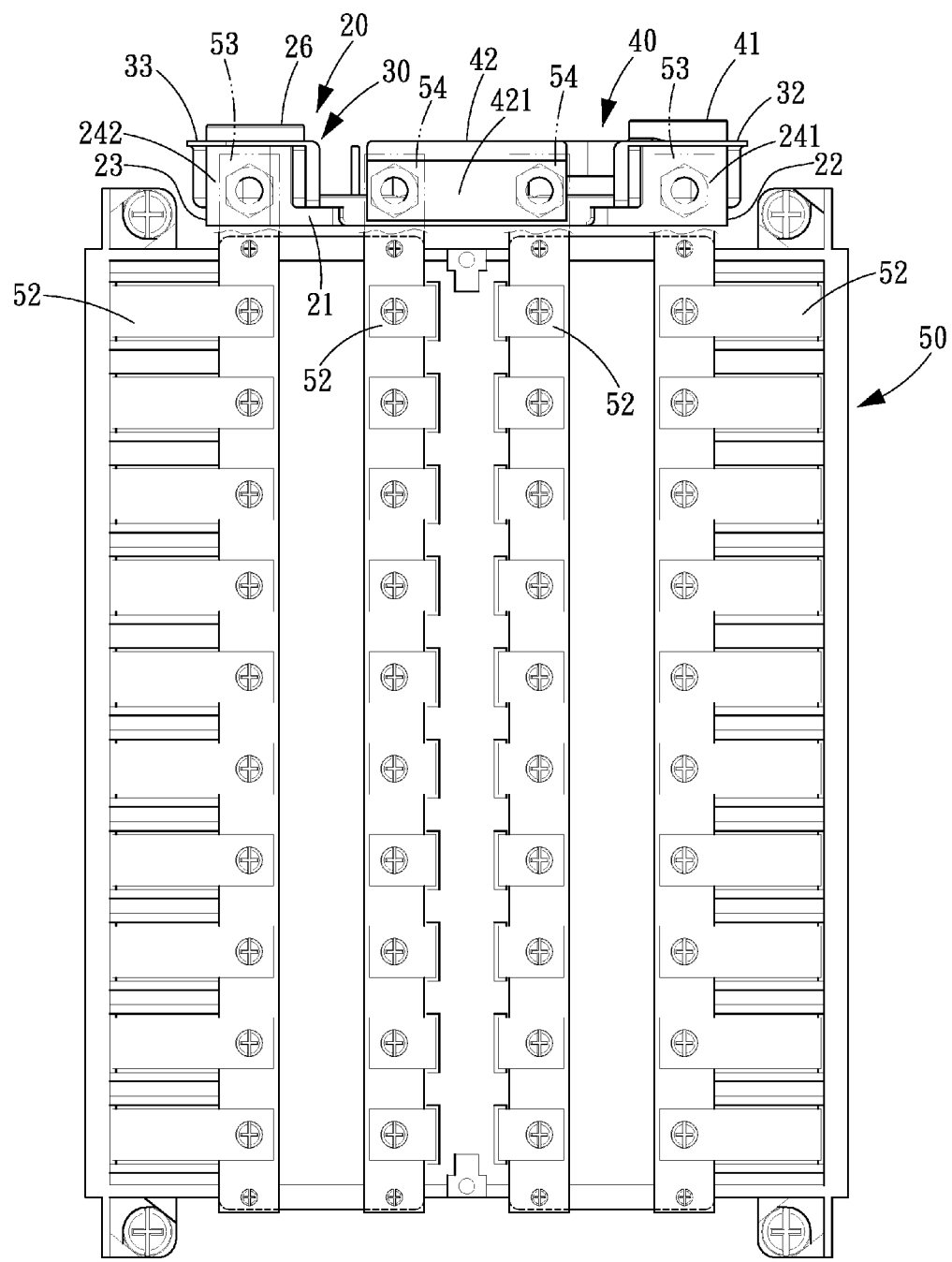
FIG. 5 is a front view showing that the terminal pole head for a battery pack in accordance with the present invention is assembled on the battery pack.
Figure 6:
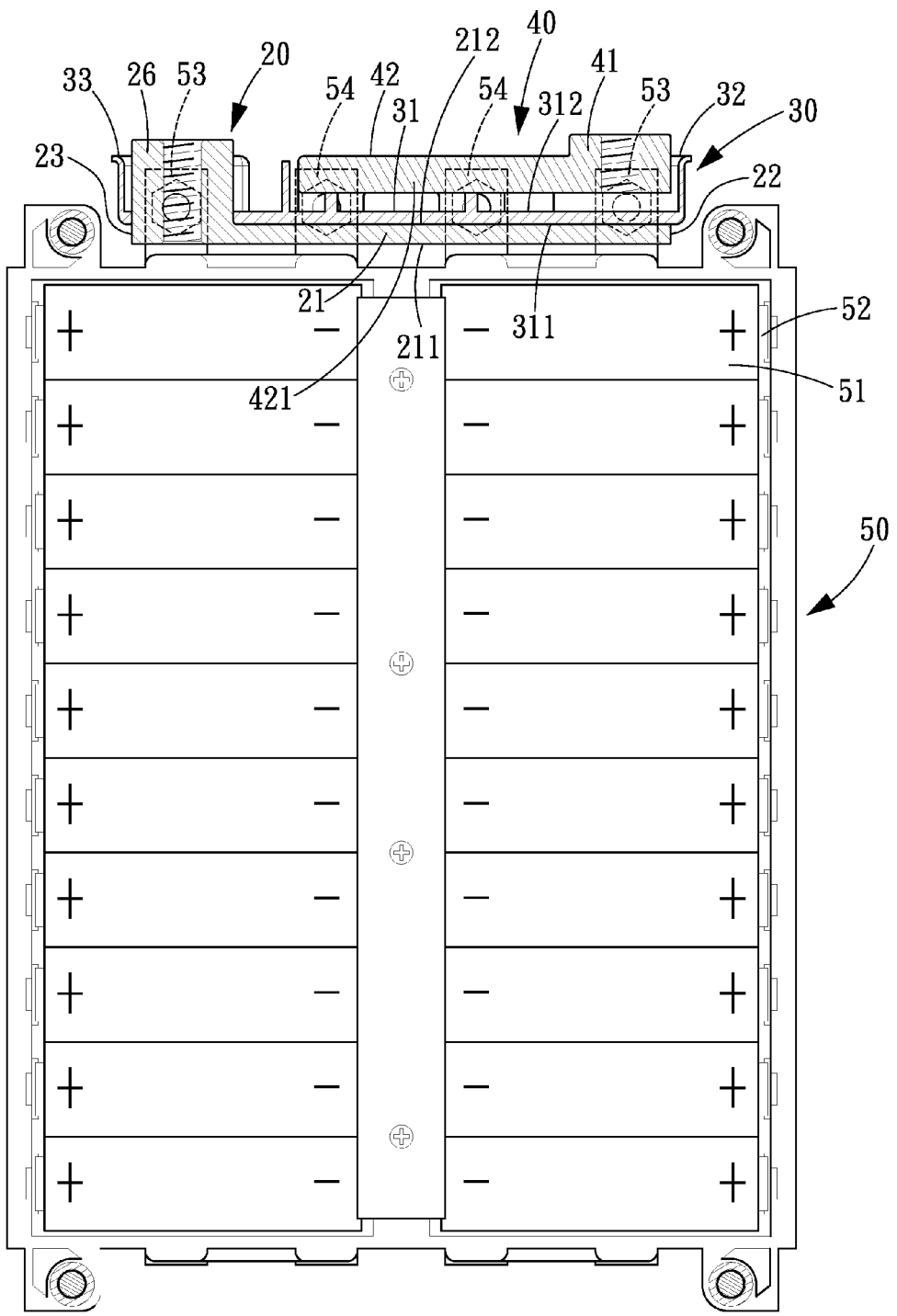
FIG. 6 is a cross-sectional view showing that the terminal pole head for a battery pack in accordance with the present invention is assembled on the battery pack.
Figure 7:
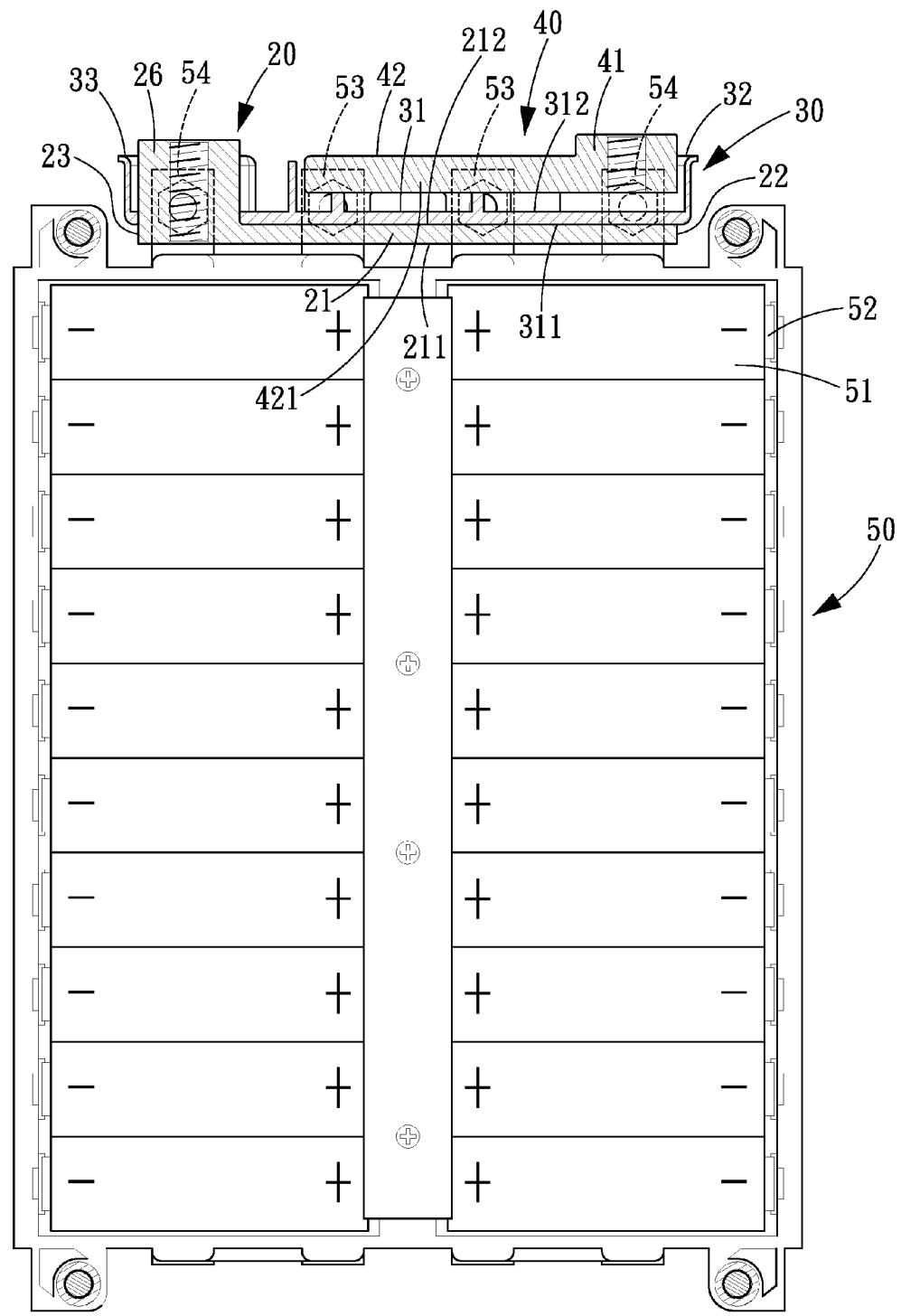
FIG. 7 is a cross-sectional view showing that the base element is connected to the negative output terminals while the top element is connected to the positive output terminals.

It is to be noted that, as shown in FIGS. 4-6, the base element 20, the isolating element 30 and the top element 40 are assembled one upon another, so that the assembly is easy, and the appearance is smooth after assembly. Further, the base element and the top element are isolated more safely. The isolating element 30 covers the main body of the base element 20 with the first and the second connecting portions 241, 251 exposed only, so that it can avoid the occurrence of short circuit of the base element 20 and the top element 40.

Alternatively, the base element 20 can also be electrically connected to the negative output terminals 54 while the top element 40 is electrically connected to the positive output terminals 53.

It is to be mentioned that, the base element 20 and the top element 40 are formed with the first connecting portions 241, the second connecting portions 251, and the connecting plates 421 to be connected to the positive output terminals 53 and the negative output terminals 54, so that the connecting points in the present invention are scattered, which is quite important for the big power battery pack 50 since it solves the problem of temperature rise caused by excessively high single point resistance.

While we have shown and described various embodiments in accordance with the present invention, it is clear to those skilled in the art that further embodiments may be made without departing from the scope of the present invention.

What is claimed is:

1. A terminal pole head for a battery pack, the battery pack including plural battery cells that are electrically connected to positive output terminals and negative output terminals through conductive strips, the terminal pole head comprising:

a base element being a conductive element and including a main plate, the main plate including a bottom surface and a top surface, the main plate further including an assembling end and an output end that are opposite each other, the assembling end being formed with two first connecting plates on two opposite sides of the top surface, the two first connecting plates being spaced by a certain distance to define a space therebetween, an outer surface of each of the two first connecting plates being defined as a first connecting portion, the output end being formed with two second connecting plates on two opposite sides of the top surface, a conductive pin protruding from the top surface between the two second connecting plates, an outer surface of each of the two second connecting plates being defined as a second connecting portion, the first connecting portions and the second connecting portions being electrically connected to the positive output terminals or the negative output terminals;

an isolating element including a base plate, the base plate including a first surface and a second surface that are opposite each other, the base plate being further formed with an isolating cap and a guide cap at two opposite ends thereof, the guide cap being formed with a guide hole at an inner side thereof while the isolating cap is formed with a groove at an inner side thereof, the isolating element covering the base element, the first surface covering the top surface of the base element, the isolating cap covering the assembling end with the first connecting portions exposed only, the guide cap covering the output end in such a manner that the conductive pin penetrates the guide hole, and only the second connecting portions of the two connecting plates are exposed; and a top element being a conductive element and formed with a conductive pin protruding from a first end thereof, a second end of the top element being formed with a conductive portion, the conductive portion being formed with two connecting plates at two opposite sides thereof, the top element being disposed on the second surface of the isolating element and isolated from the base element, the conductive pin of the top element being located within the groove of the isolating cap while the two connecting plates of the top element are located outside the main plate of the base element, the two connecting plates being electrically connected to the negative output terminals or the positive output terminals of the battery pack.

* * * * *